(12) United States Patent
Maeno

(10) Patent No.: US 7,020,078 B2
(45) Date of Patent: Mar. 28, 2006

(54) COMMUNICATION NETWORK SYSTEM AND COMMUNICATION NETWORK NODE FOR USE IN THE SAME COMMUNICATION NETWORK SYSTEM

(75) Inventor: Yoshiharu Maeno, Tokyo (JP)

(73) Assignee: NEC Corporation, (JP)

( * ) Notice: Subject to any disclaimer, the term of this patent is extended or adjusted under 35 U.S.C. 154(b) by 966 days.

(21) Appl. No.: 09/952,170

(22) Filed: Sep. 13, 2001

(65) Prior Publication Data

US 2002/0031085 A1    Mar. 14, 2002

(30) Foreign Application Priority Data

Sep. 13, 2000    (JP)    ............... 2000-277410

(51) Int. Cl.
*G01R 31/08* (2006.01)
(52) U.S. Cl. ............... 370/222; 398/3; 398/5
(58) Field of Classification Search ............... None
See application file for complete search history.

(56) References Cited

U.S. PATENT DOCUMENTS

| | | | | |
|---|---|---|---|---|
| 5,907,685 A | * | 5/1999 | Douceur | 709/248 |
| 6,654,356 B1 | * | 11/2003 | Eidson et al. | 370/303 |
| 6,751,573 B1 | * | 6/2004 | Burch | 702/178 |
| 2002/0131370 A1 | * | 9/2002 | Chuah et al. | 370/252 |
| 2002/0186716 A1 | * | 12/2002 | Eidson | 370/503 |

FOREIGN PATENT DOCUMENTS

JP    11-163911    6/1999

* cited by examiner

*Primary Examiner*—Bob A. Phunkulh
(74) *Attorney, Agent, or Firm*—Dickstein, Sharpiro, Morin & Oshinsky, LLP.

(57) ABSTRACT

In addition to five basic operation modes including "Add" operation mode, "Continue" operation mode, "Drop" operation mode, "Split and Add" operation mode and "Drop and Continue" operation mode, a function of carrying out "Time Division Switch Over" operation mode for sequentially switching over these basic operation modes in time division manner every constant time is provided in each of nodes 1 to 8. In a connection for a one-to-multiple communication, a connection for distributing a signal from the node 1 to a plurality of nodes 3, 5 and 7 is set by using "Split and Add" operation mode and "Drop and Continue" operation mode. In a connection for a multiple-to-one communication, the multiple-to-one communication is realized by timely switching between nodes performing one-to-one communication by using "Time Division Switch Over" operation mode for switching over between "Add" operation mode and "Continue" operation mode and "Time Division Switch Over" operation mode for switching over outgoing lines.

22 Claims, 11 Drawing Sheets

COMMUNICATION NETWORK SYSTEM AND COMMUNICATION NETWORK NODE FOR USE IN THE SAME COMMUNICATION NETWORK SYSTEM

BACKGROUND OF THE INVENTION

1. Field of the Invention

The present invention relates to a communication network system and a communication network node to be used in the communication network system and, particularly the present invention relates to a communication network system in which a plurality of communication network nodes are interconnected by a ring shaped transmission path and a communication network node used in the communication network system.

2. Description of Related Art

A communication network may be configured with a backbone network interconnecting a plurality of communication network nodes by means of an optical fiber ring and regional networks each connected to the backbone network in each one of the communication network nodes. The WDM (Wavelength Division Multiplexing) system in which a plurality of optical signal lines having different wavelengths are wavelength-multiplexed on an optical fiber and transmitted through the optical fiber is used between communication network nodes on a backbone network. Each communication network node (referred to as "node", hereinafter) functions as an ADM ("Add"/"Drop" multiplexer) device for adding all incoming line from a regional network or from a terminator or repeater device, which terminates or repeats a signal line from regional network, to a specific wavelength line of the backbone network and for dropping a specific wavelength line of the backbone network to an outgoing line connected to a regional network or to a terminator or repeater device.

A connection consisting of wavelength lines of the backbone network are transferred through nodes without being added or dropped in the node. A connection from a certain regional network to another regional network is added to the backbone network at a certain one of the nodes and, after being transferred through a plurality of transit nodes, is dropped from the backbone network at another node. A signal transfer between arbitrary regional networks is realized by setting up a connection consisting of suitable wavelength lines un the backbone network by suitably configuring every node along the connection in one of three operation modes, that is, "Add", "Continue" and "Drop" operation modes.

FIG. 10 is a block diagram schematically showing such communication network system. In FIG. 10 nodes 1 to 8 are interconnected by a backbone network composed of optical fiber rings 11 to 14. Ring 11 is a clockwise working ring, ring 12 is a counterclockwise working ring, ring 13 is a clockwise backup ring and ring 14 is a counterclockwise backup ring.

In this example shown in FIG. 10, a connection transferring a signal from node 1 to node 5 through nodes 2 to 4 is realized by configuring node 1 in "Add" operation mode, node 5 in "Drop" operation mode and nodes 2 to 4 in "Continue" operation modes.

A 4-fiber bidirectional ring system using four optical fibers including one clockwise working ring, one counterclockwise working ring, one clockwise backup ring and one counterclockwise backup ring as a set is as applied to the ring shaped optical fiber communication network fur interconnecting nodes 1 to 8 as shown in FIG. 10. For setting up a connection between arbitrary two nodes, the clockwise working ring or the counterclockwise working ring is used.

When a failure such as an optical fiber cut between adjacent nodes or a failure of a node configured in "Continue" operation mode occurs to connection, a bypass route for bypassing the location of the failure is provided by employing the counterclockwise backup ring substituting the clockwise working ring and the clockwise backup ring substituting the counterclockwise working ring. When an extraordinary signal caused by the failure is detected at node 5 configured in "Drop" operation mode, node 1 configured in "Add" operation mode by a control message. Upon this control message, the working rings are switched over to the backup rings at both nodes 1 and 5 to set up a bypass route, so that the connection transferring the signal is recovered from the failure quickly.

FIG. 11A shows an example of a route setup for a connection from node 1 to node 5 in the 4-fiber bidirectional ring including nodes 1 to 8 shown in FIG. 10 and an operation of the ring when a failure to the connection is detected between nodes 4 and 5. FIG. 11B shows an example of a bypass route setup after the failure is detected in the case shown in FIG. 11B, counterclockwise backup ring 14 is used as the bypass route for clockwise working ring 11. An example of such scheme is disclosed in JP H11-163911A.

In the above mentioned conventional system, however, there are the following problems. The first of the problems is that it is possible only to set up for a connection for a one-to-one communication when the nodes are configured in one of the three operation modes, that is, "Add", "Continue" and "Drop" operation modes. It means that in order to set up a connection for a one-to-multiple communication or a multiple-to-one communication, connections for multiple one-to-one communication consisting of a plurality of optical fibers or a plurality wavelength lines must be used, reducing the efficiency of the communication network system This is because only three operation modes are given to each node.

The second problem is that, in the conventional failure recovery procedure, the bypass setup for a connection for both of the one-to-multiple and the multiple-to-one communication is impossible. The reason for this is that, since there are a number of nodes related to the connection for the one-to-multiple and the multiple-to-one communications, it is impossible to set up a bypass route by simply switching over the working rings to the backup rings only at the nodes configured in "Add" or "Drop" operation mode located at both ends of the connection.

SUMMARY OF THE INVENTION

An object of the present invention is to provide a communication network system capable of realizing a connection for one-to-multiple communication and a multiple-to-one communication without requiring a plurality of optical fibers or a plurality of wavelength lines and a communication network node for use in the communication system.

Another object of the present invention is to provide a communication network system capable to making a failure recovery, which is broken by a failure, possible by setting up a bypass route immediately when the failure occurs in a connection for a one-to-multiple communication and a multiple-to-one communication and a communication network node for use in the communication system.

According to the first aspect of the present invention, it is provided a communication network system comprising a ring transmission path including a clockwise ring and a counterclockwise ring, a plurality of communication network nodes on said rings and a control means to provide a connection from an incoming line and to an outgoing line on said rings, wherein said control means configures each of said communication network nodes in "Add" operation made in which said incoming line is added to said connection, "Split and Add" operation mode in which said incoming line is split and added to branch routes of said connection, "Drop" operation mode in which said outgoing line is dropped from said connection, "Continue" operation mode in which said connection is transferred to another of said communication network nodes or "Drop and Continue" operation mode in which said connection is split, dropped to said outgoing line and transferred to another of said communication network nodes.

In this communication network system, a connection for a one-to-multiple communication may be provided, by means of that, along said connection from one of said communication network nodes configured in "Add" operation mode to another one of said communication network nodes configured in "Drop" operation mode, others of said communication network nodes are configured in "Drop and Continue" operation mode or configured in "Continue" operation mode.

In a case where a failure occurs on a working route, said connection can be recovered from a failure on a working route because of a bypass route set up on a backup ring in the direction opposite to a working ring on which said working route is set up, by means of that, if there is none of said communication network nodes configured in "Drop and Continue" operation mode between the location of said failure and said communication network node configured in "Add" operation mode, said communication network node configured in "Add" operation mode is reconfigured to add said incoming line to said backup ring, otherwise, said communication network node configured in "Add" operation mode is reconfigured in "Split and Add" operation mode to add said incoming line to said backup ring and said working ring.

In this case, failure recovery may be initiated, by means of that said communication network node configured in "Drop" operation mode detects an extraordinary signal caused by said failure and transmits a control message to notify said failure to said communication network node configured in "Add" operation mode over a ring bypassing said failure.

A connection for a one-to-multiple communication may be provided, by means of that, along two branch routes for said connection on said clockwise ring and on said counterclockwise ring respectively from one of said communication network node configured in "Split and Add" operation mode to two of said communication network nodes configured in "Drop" operation mode, others of said communication network nodes are configured in "Drop and Continue" operation mode or configured in "Continue" operation mode.

In a case where a failure occurs on a working route in the connection for the one-to-multiple communication, said connection can be recovered from a failure on one of said two branch routes because of the expansion of another one of said two branch routes onto a backup ring towards the location of said failure as a bypass, by means of that said communication network node configure in "Drop" operation mode on said another one of said two branch routes is reconfigured in "Drop and Continue" operation mode.

In the latter case, failure recovery may be initiated, by means of that said communication network node configured in "Drop" operation mode on said one of said two branch routes detects an extraordinary signal caused by said failure and transmits a control message to notify said failure to said communication network node configured in "Drop" operation mode on said another one of said two branch routes over a ring bypassing said failure.

Said control means may configure said communication network nodes in "Time Division Switch Over" operation mode to alternately switch over among "Add" operation mode, "Drop" operation mode and "Continue" operation mode.

Said control means may further configure said communication network nodes in "Time Division Switch Over" operation mode to alternately switch over among "Add" operation mode, "Drop" operation mode and "Continue" operation mode, and a connection for a time division multiplexed multiple-to-one communication may be provided, by means of that, alone said connection from one of said communication network nodes configured in "Add" operation mode to another one of said communication network node configured in "Drop" operation mode, others of said communication network nodes are configured in "Time Division Switch Over" operation mode to alternately switch over between "Add" operation mode and "Continue" operation mode or configured in "Continue" operation mode.

Said connection can be recovered from a failure on a working route because of a bypass route set up on a backup ring in the direction opposite to a working ring on which said working route is set up, by means of that, if there is none of said communication network nodes configured in "Time Division Switch Over" operation mode between the location of said failure and said communication network node configured in "Drop" operation mode, said communication network node configured in "Drop" operation mode is reconfigured to drop said outgoing line from said backup ring, otherwise, said communication network node configured in "Drop" operation mode is reconfigured in "Time Division Switch Over" operation mode to alternately switch over between "Drop" operation mode to drop said outgoing line from said working ring and another "Drop" operation mode to drop said outgoing line from said backup ring.

Said control means may configure said communication network node in "Time Division Switch Over" operation mode to alternately switch over among "Add" operation mode. "Drop" operation mode and "Continue" operation mode, and wherein a connection for a time division multiplexed multiple-to-one communication is provided, by means of that, along two branch routes for said connection on said clockwise ring and on said counterclockwise ring respectively from two of said communication network nodes configured in "Add" operation mode to one of said communication network nodes configured in "Time Division Switch Over" operation mode to alternately switch over between "Drop" operation mode to drop said outgoing line from said clockwise ring and "Drop" operation mode to drop said outgoing line from said counterclockwise ring, others of said communication network nodes are configured in "Time Division Switch Over" operation mode to switch over between "Add" operation mode and "Continue" operation mode or configured in "Continue" operation mode.

In a case where a failure occurs on said working route in the latter case, said connection can be recovered from a failure on one of said two branch routes because of the extension of another one of said two branch routes onto a backup ring towards the location of said failure as a bypass by means of that said communication network node configured in "Add" operation mode on said another one of said two branch routes is reconfigured in "Time Division Switch Over" operation mode to alternately switch over between "Add" operation mode and "Continue" operation mode.

Said control means may configure sad communication network nodes in "Time Division Switch Over" operation mode to alternately switch over among "Add" operation mode, "Split and Add" operation mode. "Drop" operation mode, "Continue" operation mode or "Drop and Continue" operation mode.

In the latter case, a downstream connection for a one-to-multiple communication may be provided, by means of that, along said connection from one of said communication network nodes configured in "Add" operation mode to another one of said communication network nodes configured in "Drop" operation mode, others of said communication network nodes are configured in "Drop and Continue" operation mode or configured in "Continue" operation mode, said wherein an upstream connection for a multiple-to-one communication is provided, by means of that, along said connection from one of said communication network nodes configured in "Add" operation mode to another one of said communication network node configured in "Drop" operation mode, others of said communication network nodes are configured in "Time Division Switch Over" operation mode to switch over between "Add" operation mode and "Continue" operation mode or configured in "Continue" operation mode.

In the latter case, a downstream connection for a one-to-multiple communication may be provided, by means of that, along said connection from one of said communication network nodes configured in "Add" operation mode to another one of said communication network nodes configured in "Drop" operation mode, others of said communication network nodes are configured in "Drop and Continue" operation mode or configured in "Continue" operation mode, and an upstream connection for a multiple-to-one communication is provided, by means of that, along two branch routes for said connection on said clockwise ring and on said counterclockwise ring respectively from two of said communication network nodes configured in "Add" operation mode to one of said communication network nodes configured in "Time Division Switch Over" operation mode to alternately switch over between "Drop" operation mode to drop said outgoing line from said clockwise ring and "Drop" operation mode to drop said outgoing line from said counterclockwise ring, others of said communication network nodes are configured in "Time Division Switch Over" operation mode to switch over between "Add" operation mode and "Continue" operation mode or configured in "Continue" operation mode.

Alternatively, a downstream connection for a one-to-multiple communication may be provided, by means of that, along two branch routes for said connection on said clockwise ring and on said counterclockwise ring respectively from one of said communication network nodes configured in "Split and Add" operation mode to two of said communication network nodes configured in "Drop" operation mode, others of said communication network nodes are configured in "Drop and Continue" operation mode or configured in "Continue" operation mode, and an upstream connection for a multiple-to-one communication is provided, by means of that, along said connection from one of said communication network nodes configured in "Add" operation mode to another one of said communication network node configured in "Drop" operation mode, others of said communication network nodes are configured in "Time Division Switch Over" operation mode to switch over between "Add" operation mode and "Continue" operation mode or configured in "Continue" operation mode.

Alternatively, a downstream connection for a one-to-multiple communication may be provided, by means of that, along two branch routes for said connection on said clockwise ring and on said counterclockwise ring respectively from one of said communication network nodes configured in "Split and Add" operation mode to two of said communication network nodes configured in "Drop" operation mode, others of said communication network nodes are configured in "Drop and Continue" operation mode or configured in "Continue" operation mode, and an upstream connection for a multiple-to-one communication may be provided, by means of that, along two branch routes for said connection on said clockwise ring and on said counterclockwise ring respectively from two of said communication network nodes configured in "Add" operation mode to one of said communication network nodes configured in "Time Division Switch Over" operation mode to alternately switch over between "Drop" operation mode to drop said outgoing line from said clockwise ring and "Drop" operation mode to drop said outgoing line from said counterclockwise ring, others of said communication network nodes are configured in "Time Division Switch Over" operation mode to switch over between "Add" operation mode and "Continue" operation mode or configured in "Continue" operation mode.

Said ring transmission path may include a working clockwise ring, a working counterclockwise ring, a backup clockwise ring and a backup counterclockwise ring, and said downstream connection and said upstream connection on said working rings can be recovered from a failure because of bypass routes set up on said backup rings.

Said communication network node configured in "Add" operation mode for said downstream connection may transmit a control message to instruct said communication network node configured in "Time Division Switch Over" operation mode for said upstream connection to alternately switch over between operation modes, and may transmit a control message to instruct said communication network nodes to reconfigure operation modes for said upstream connection when a failure occurs, over said downstream connection.

According to the second aspect of the present invention, it is provided a communication network node within a communication network system comprising a ring transmission path including a clockwise ring and a counterclockwise ring and a plurality of communication network nodes on said rings to provide a connection from an incoming line and to an outgoing line on said rings, wherein said communication network node includes a control means to configure each of said communication network node in "Add" operation mode in which said incoming line is added to said connection, "Split and Add" operation mode in which said incoming line is split and added to branch routes of said connection, "Drop" operation mode in which said outgoing line is dropped from said connection, "Continue" operation mode in which said connection is transferred to another of said communication network nodes or "Drop and Continue" operation mode in which said connection is split, dropped to said outgoing line and transferred to another of said communication network nodes.

The node may further comprise a matrix type optical switch to set up said connections on said rings from said incoming line to said outgoing line and a splitter device to connect one of input terminals of said matrix type optical switch to a plurality of output terminals of said matrix type optical switch and the control means controls "Time Division Switch Over" operation mode to alternately switch over among "Add" operation mode, "Split and Add" operation mode, "Drop" operation mode, "Continue" operation mode or "Drop and Continue" operation mode.

Describing the operation of the node the node is provided with, in addition to the five basic operation modes, that is, "Add" operation mode, "Continue" operation mode, "Drop" operation mode, "Split and Add" operation mode and "Drop and Continue" operation mode, a function of performing "Time Division Switch Over" operation mode for sequentially switching over the five basic operation modes every constant time. "Split and Add" operation mode and "Drop and Continue" operation mode are used for a connection, that is, the downstream connection, for the one-to-multiple communication to set up connections for distributing a signal from one node to a plurality of nodes. On the other hand, for a connection, that is, the upstream connection, for a multiple-to-one communication, "Time Division Switch Over" ("Time Division Add or Continue") operation mode ("Add or Continue") for switching over "Add" operation and "Continue" operation and "Time Division Switch Over" ("Time Division Drop") operation mode ("Drop or Drop") for switching over outgoing lines are used. The multiple-to-one communication is realized by timely switching groups of nodes each performing a one-to-one communication. The time division switch over of the basic operation modes required by the upstream connection is instructed by transferring the control message using the downstream connection.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1A:
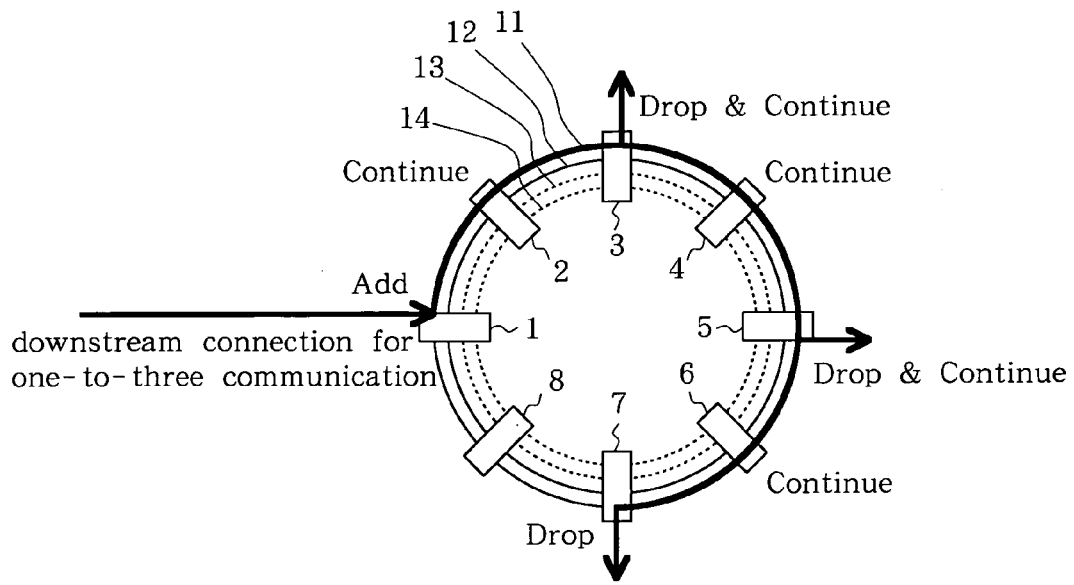
FIG. 1A and FIG. 1B show route of connections for a one-to-multiple communication and for a multiple-to-one communication in a 4-fiber bidirectional ring network and an example of operation mode configurations of respective nodes in a downstream connection and an upstream connection of the ring, respectively.
Figure 1B:
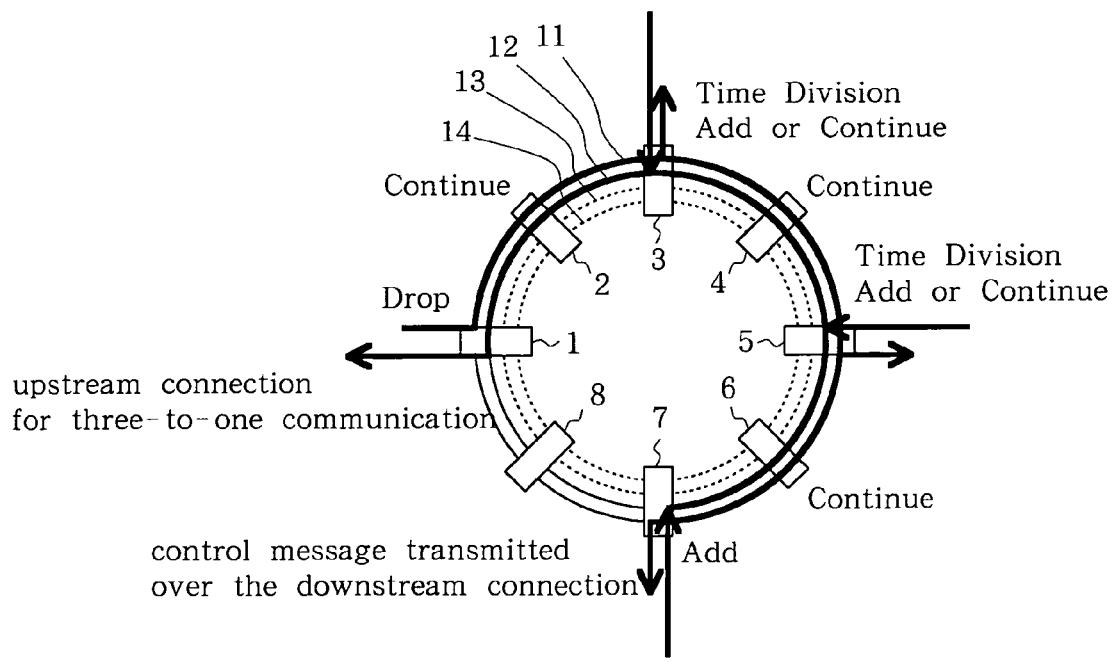
Figure 10:
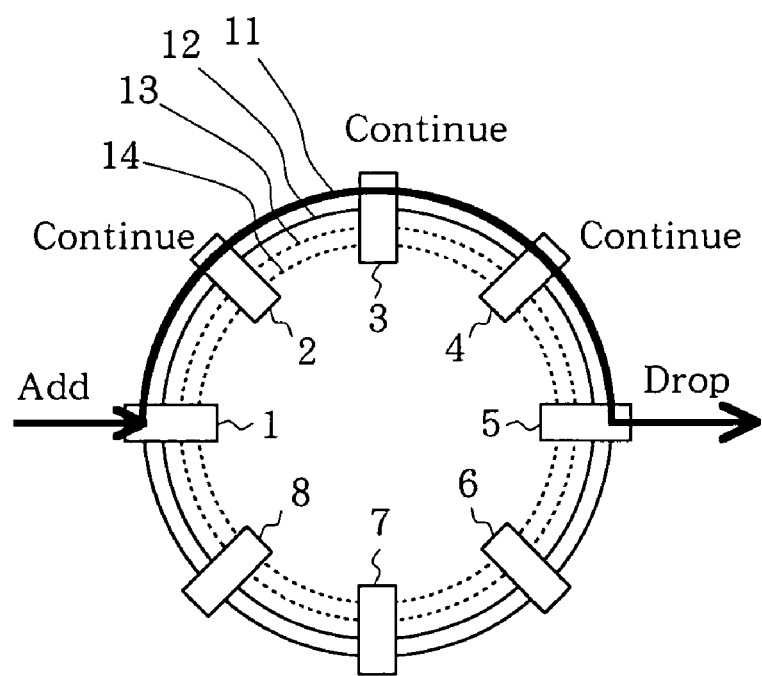
FIG. 10 shows an example of a configuration of a conventional 4-fiber bidirectional ring network.
Figure 11A:
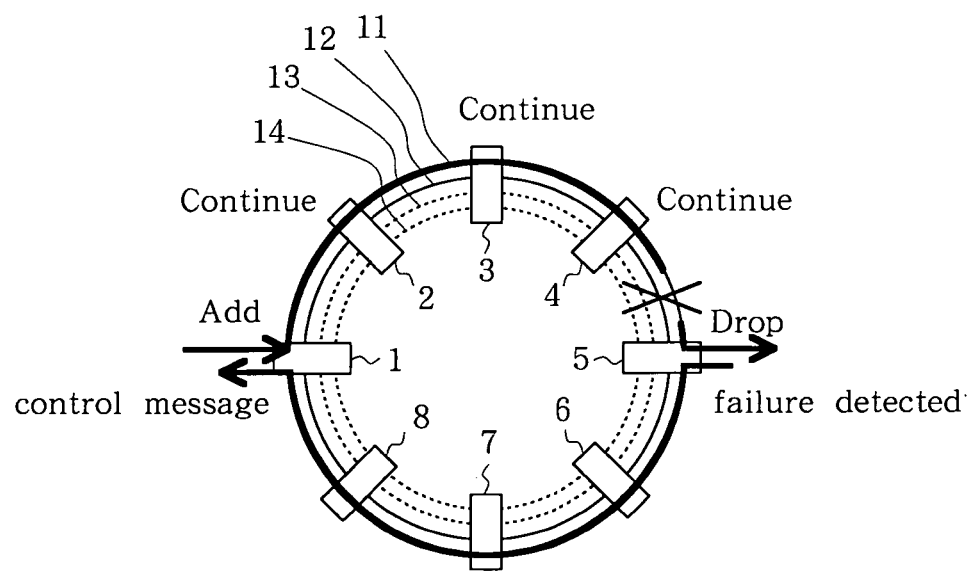
FIG. 11A and FIG. 11B show a route setup in the conventional example and an example of a failure recovery, respectively.
Figure 11B:
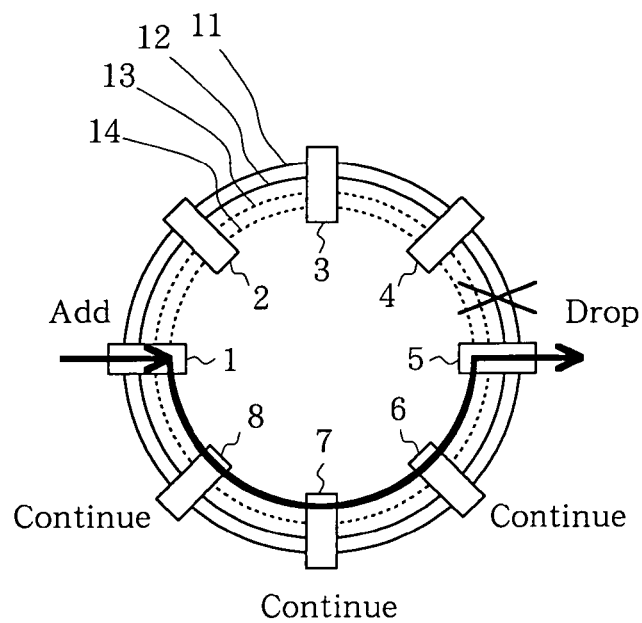

Now, preferred embodiments of the present invention will be described in detail with reference to the drawings. Referring to FIG. 1A and FIG. 1B, which schematically show a system configuration according to a first embodiment of the present invention, in which identical portions shown in FIG. 10, FIG. 11A and FIG. 11B are depicted by identical numerals, respectively. In this embodiment, examples of operation mode configuration for eight nodes 1 to 8, of which a 4-fiber bidirectional ring network consists, are shown in case where connections for a one-to-multiple communication and a multiple-to-one communication are set up over the 4-fiber bidirectional ring network. FIG. 1A shows a downstream connection for a one-to-three communication from node 1 to nodes 3, 5 and 7 and FIG. 1B shows an upstream connection for a three-to-one communication from nodes 3, 5 and 7 to node 1.

In FIG. 1A and FIG. 1B, the downstream connection is set up on working clockwise ring 11 and node 1 is configured in "Add" operation mode in which an incoming line is added into the downstream connection on working clockwise ring 11. Nodes 3 and 5 are configured in "Drop and Continue" operation mode in which the downstream connection on working clockwise ring 11 is split into two and then transferred to an outgoing lines and simultaneously to adjacent nodes 4 and 6, respectively. Node 7 located at the, tail end of the downstream connection is configured in "Drop" operation mode in which an outgoing line is dropped from the downstream connection on working clockwise ring 11. Nodes 2, 4 and 6 are configured in "Continue" operation mode in which the downstream connection is transferred to the adjacent nodes 3, 5 and 7, respectively.

The upstream connection is set up on working counterclockwise ring 12 and node 1 is configured in "Drop" operation mode to drop an outgoing line from the upstream connection on working counterclockwise ring 12. Nodes 3 and 5 are configured in "Time Division Switch Over" ("Time Division Add or Continue") operation mode in which nodes 3 and 5 alternately switch over between "Add" operation mode to add an incoming line into the upstream connection on working counterclockwise ring 12 and "Continue" operation mode in which the upstream connection is transferred to adjacent nodes 4 and 6 every constant time interval. Node 7 is configured in "Add" operation mode to add an incoming line upstream connection on working counterclockwise ring 12. Nodes 2, 4 and 6 ire configured in "Continue" operation mode.

Over the downstream connection shown in FIG. 1A, node 1 transmits control messages to other nodes along the connection, which instruct nodes configured in "Time Division Add or Continue" operation mode to switch over from "Add" operation mode to "Continue" operation mode and vice versa for the upstream connection. Since only nodes 3 and 5 are configured in "Time Division Add or Continue" operation mode, nodes 3 and 5 carry out the switch over between "Add" operation mode and "Continue" operation mode according to the control messages. The time division multiplexed three-to-one communication is realized on the upstream connection by selecting one out of a one-to-one communication between node 1 and node 3, a one-to-one communication between node 1 and node 5 or a one-to-one communication between node 1 and node 7 every constant time interval.

Figure 2:
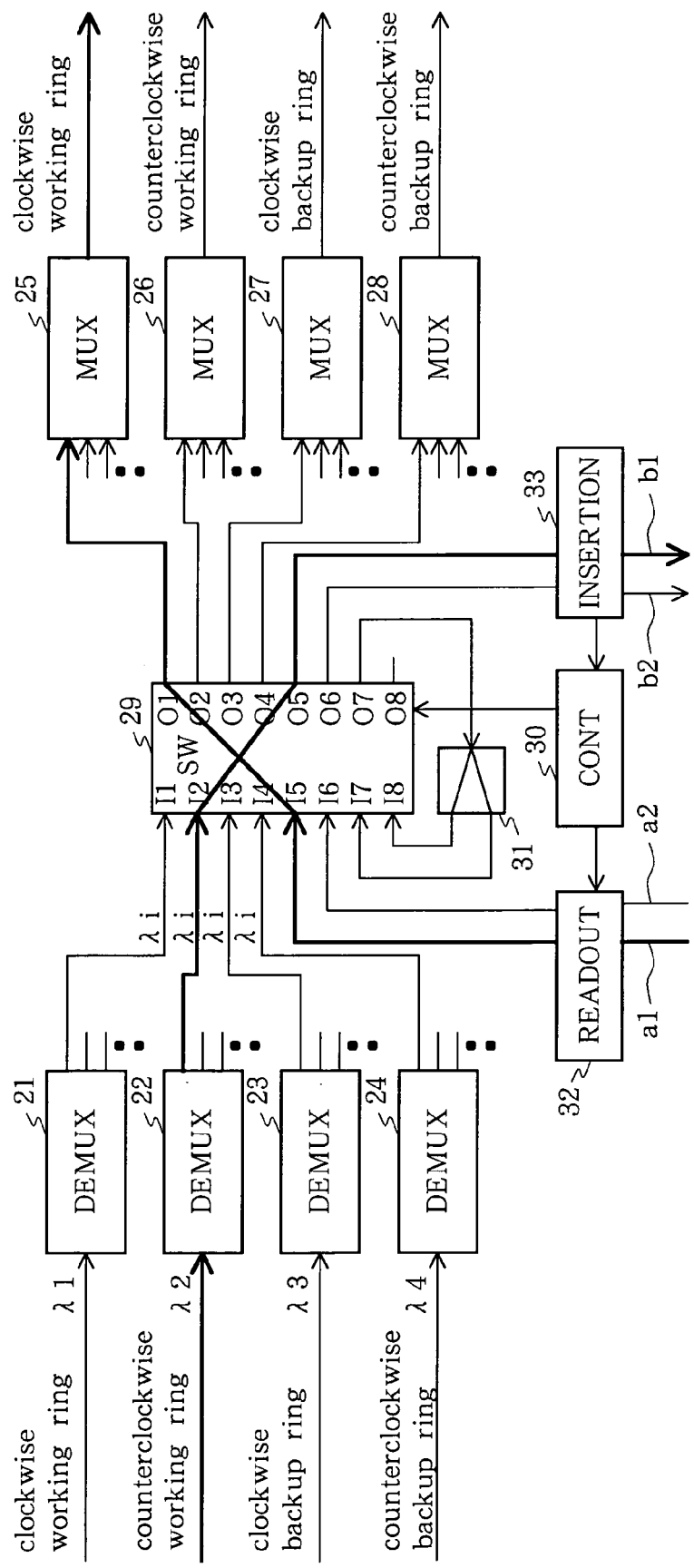
FIG. 2 shows an example of a configuration of node 1 shown in FIG. 1A and FIG. 1B and the operation mode configuration thereof.

Referring to FIG. 2, which shows an example of a configuration of the node, wavelength lines λ1 to λn, which are wavelength division multiplexed on the four optical fibers of which the ring network consists, are demultiplexed to respective wavelength lines by wavelength demultiplexers 21 to 24, and inputted to 8×8 matrix type optical switch 29 having eight input terminals I1 to terminals I1 to I8 and eight output terminals O1 to O8. Configuration, reconfiguration or the time division switch over of 8×8 matrix type optical switch 29 it controlled by control circuit 30.

The wavelength lines outputted from optical switch 29 are multiplexed by wavelength multiplexers 25 to 28 and outputted to the four optical fibers of which the ring network consists. Two incoming lines a1 and a2 to be added to the ring network, two outgoing lines b1 and b2 to be dropped from the ring network and 1×2 splitter device 31 for splitting an input line to two output lines are connected to 8×8 matrix type optical switch 29.

Further, control message readout circuit 33 to read out control messages from outgoing lines b1 and b2, control message insertion circuit 32 to insert control messages to incoming lines a1 and a2 and control circuit 30 to process of the control messages, and to configure, reconfigure or time division switch over 8×8 matrix type optical switch 29 are provided.

In FIG. 2, configuration of 8×8 matrix type optical switch 29 within node 1 in the state shown in FIG. 1A and FIG. 1B is shown. That is, a downstream connection is added from incoming line a1 connected to input terminal I5 to the working clockwise ring through output terminal O1 and an upstream connection on the working counterclockwise ring connected to input terminal I2 is dropped to outgoing line b1 connected to output terminal O5.

Figure 3:
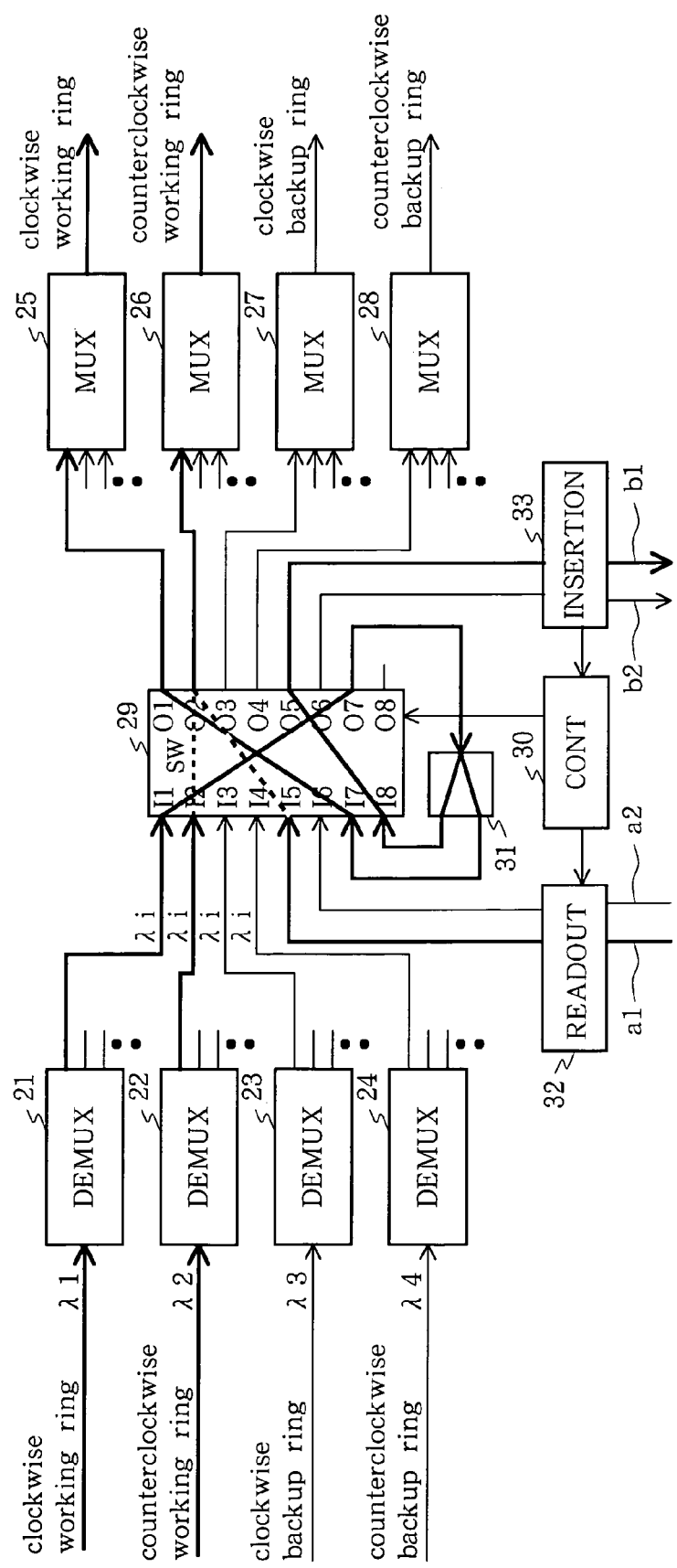
FIG. 3 shows an example of operation mode of node 3 shown in FIG. 1A and FIG. 1B.

FIG. 3 shows configuration of 8×8 matrix type optical switch 29 within node 3 in the state shown in FIG. 1A and FIG. 1B. In FIG. 3, the downstream connection on the working clockwise ring inputted from node 1 to input terminal I1 is dropped to outgoing line b1 connected to output terminal O5 and is simultaneously transferred to the downstream connection to nodes 5 and 7 connected to output terminal O1 by means of 1×2 splitter device 31. The upstream connection from nodes 5 and 7 on the working counterclockwise ring, which are connected to input terminal I2, and incoming line a1 connected to input terminal I5, are outputted alternately to the upstream connection to node 1 connected to output terminal O2 every constant time interval. This operation of time division switch over for the upstream connection is initiated by the control message transferred on the downstream connection from node 1 to outgoing line b1 instructing 8×8 matrix type optical switch 29 to carry out the time division switch over.

Figure 4A:
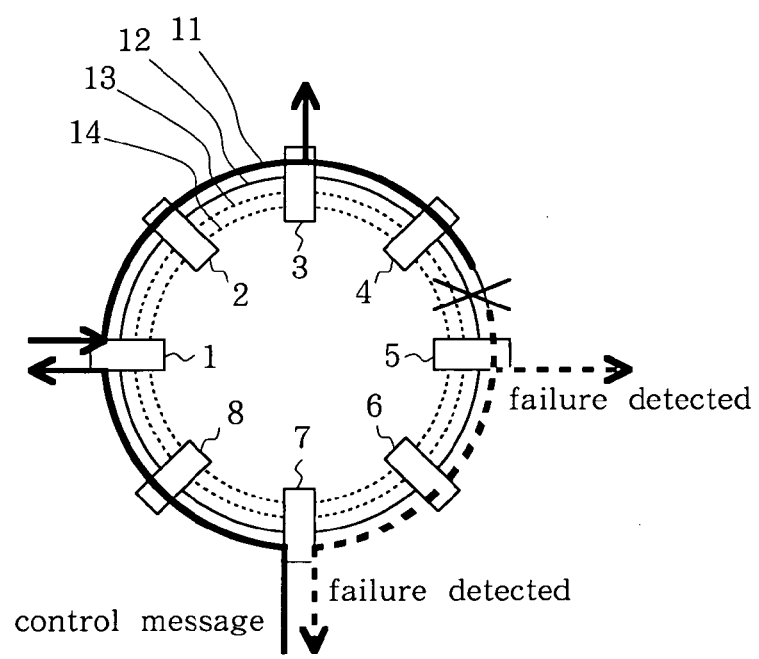
FIG. 4A and FIG. 4B show examples of depletion of an extraordinary signal caused by a failure of the communication line and transfer of a control message for a downstream connection and an upstream connection, respectively.
Figure 4B:
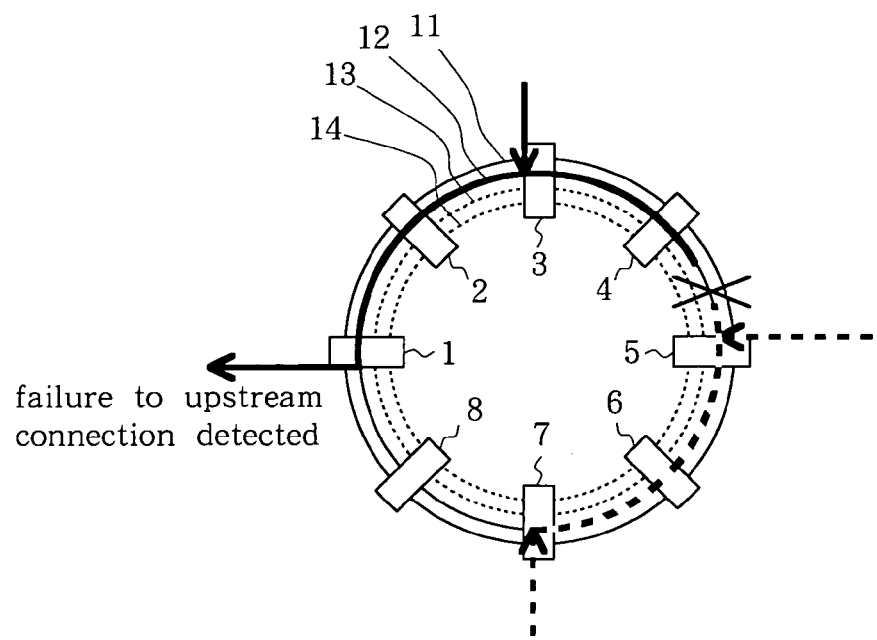

FIG. 4A to FIG. 7B show the failure recovery procedures for setting up bypass routes for the downstream connection for the one-to-three communication and the upstream connection for the three-to-one communication, which are described in FIG. 1A and FIG. 2B, in case where a failures occurs in to the se connections, respectively. In these figures, a symbol X shows a location at which the failures occur Referring to FIG. 4A and 4B, first, an extraordinary signal on the downstream connection due to the failure is detected when an optical fiber between node 4 and node 5 is cut or broken. The failure to the downstream connection is detected by nodes 5 and 7 as shown in FIG. 4A. Node 7, which is located at the tail end of the downstream connection, transmits a control message toward node 1 for notifying node 1 of the detection of the extraordinary signal. Node 8 can directly transfers the control message to node 1. Or node 8 may reads out, then insert again and transfers the control message to node 1. Node 1 is notified the failure to the downstream connection by the control message transmitted from node 7. Further, as shown in FIG. 4B, node 1 also detects the failure to the upstream connection by an extraordinary signal on the upstream connection from nodes 5 and 7.

Figure 5A:
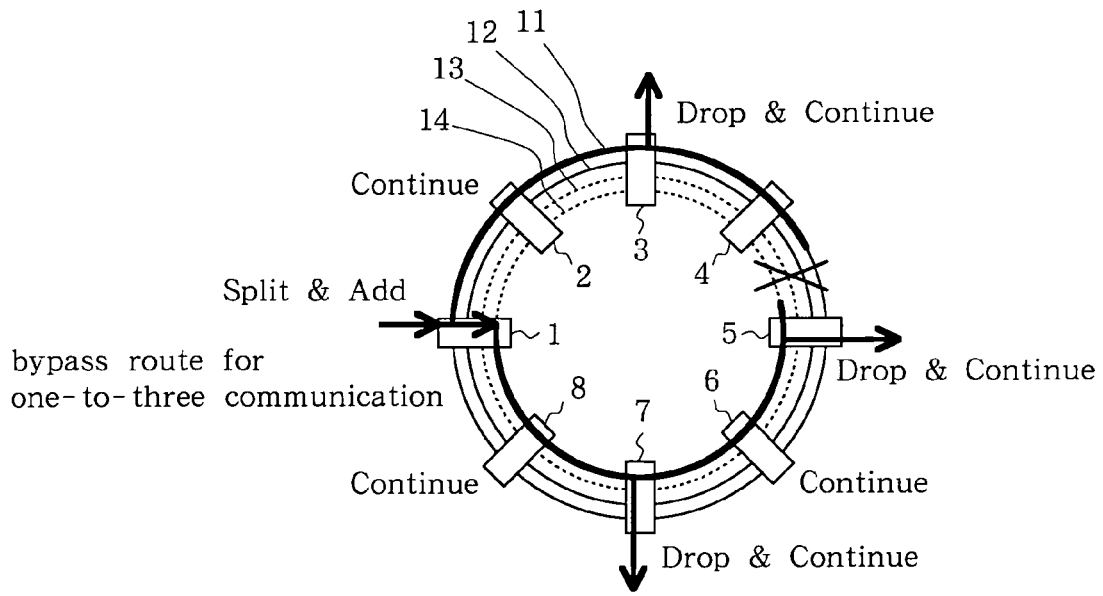
FIG. 5A and FIG. 5B show examples of a setup of a bypass route and a configuration of an operation mode for a downstream connection and an upstream connection after the connections are recovered from the failure.
Figure 5B:
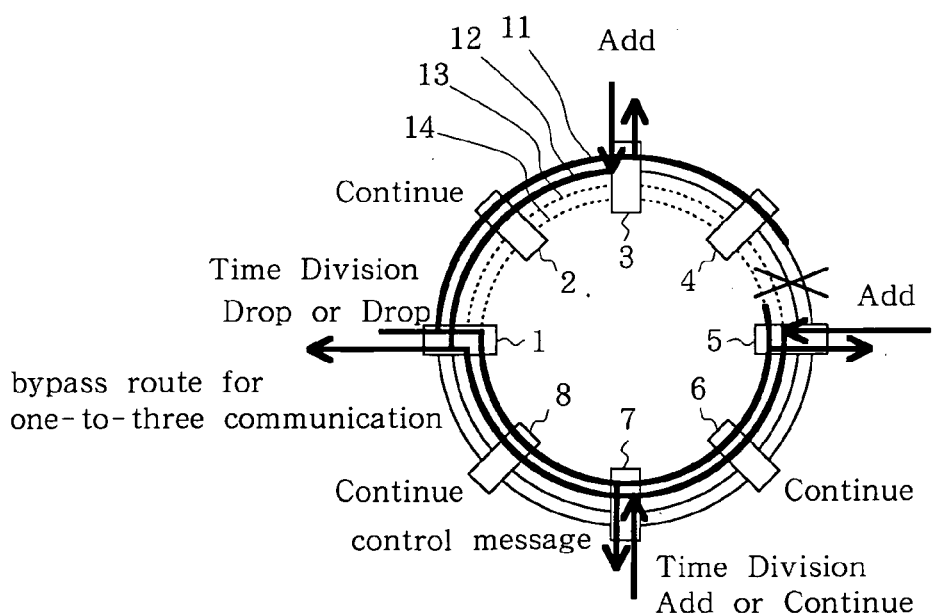

FIG. 5A and FIG. 5B show bypass routes, which are set up upon the detection of the extraordinary signal to avoid the failure. As shown in FIG 5A, for the downstream connection, nodes 5 and 7, which detect the extraordinary signal reconfigures their operation modes to "Drop and Continue" operation to drop an outgoing line from the downstream connection on backup counterclockwise ring 14 and simultaneously to transform the downstream connection. And node 1 notified the extraordinary signal reconfigures its operation mode to "Split and Add" operation mode in which a downstream connection is set up on not only working clockwise ring 11 but also backup counterclockwise ring 14.

In case where node 8 was not in "Continue" operation mode and operated to add or drop a line with respect to a working ring before the failure occurred, for a backup ring, node 8 is reconfigured to "Continue" operation mode according to the first control message which is transferred from node 7 when the failure is detected, or a second control message from node 1 for instructing node 8 to reconfigure its operation mode Thereafter, node 1 transmits a control message over the downstream connection which is recovered from the failure by setting up a bypass route. The control message instructs to reconfigure the operation mode to carry out the time division switch over for the upstream connection. Node 1 instructs node 3, which did not detect the extraordinary signal in the upstream connection, to keep configuring the upstream connection on working counterclockwise ring 12 as before and instructs nodes 5 and 7, which detected the extraordinary signal, to set up a bypass route for the upstream connection by utilizing backup clockwise ring 13.

As shown in FIG. 5B, for the downstream connection, the operation modes of nodes 3 and 5, which are now located at the ends of the bypass route, are therefore reconfigured to "Add" operation mode and the operation mode of node 7 is reconfigured to "Time Division Add or Continue" operation. According to the control message from node 1, the operation mode of node 7 is alternately switched over between "Add" operation mode and "Continue" operation mode. Node 1 is reconfigured to "Time Division Switch Over" ("Time Division Drop") operation mode to select one out of the one-to-one communication with node 3 in the working counterclockwise ring, the one-to-one communication with node 5 in the backup clockwise ring or the one to-one communication with node 7 in the backup counterclockwise ring every constant time interval. The upstream connection is also recovered from the failure in this manner.

Figure 6:
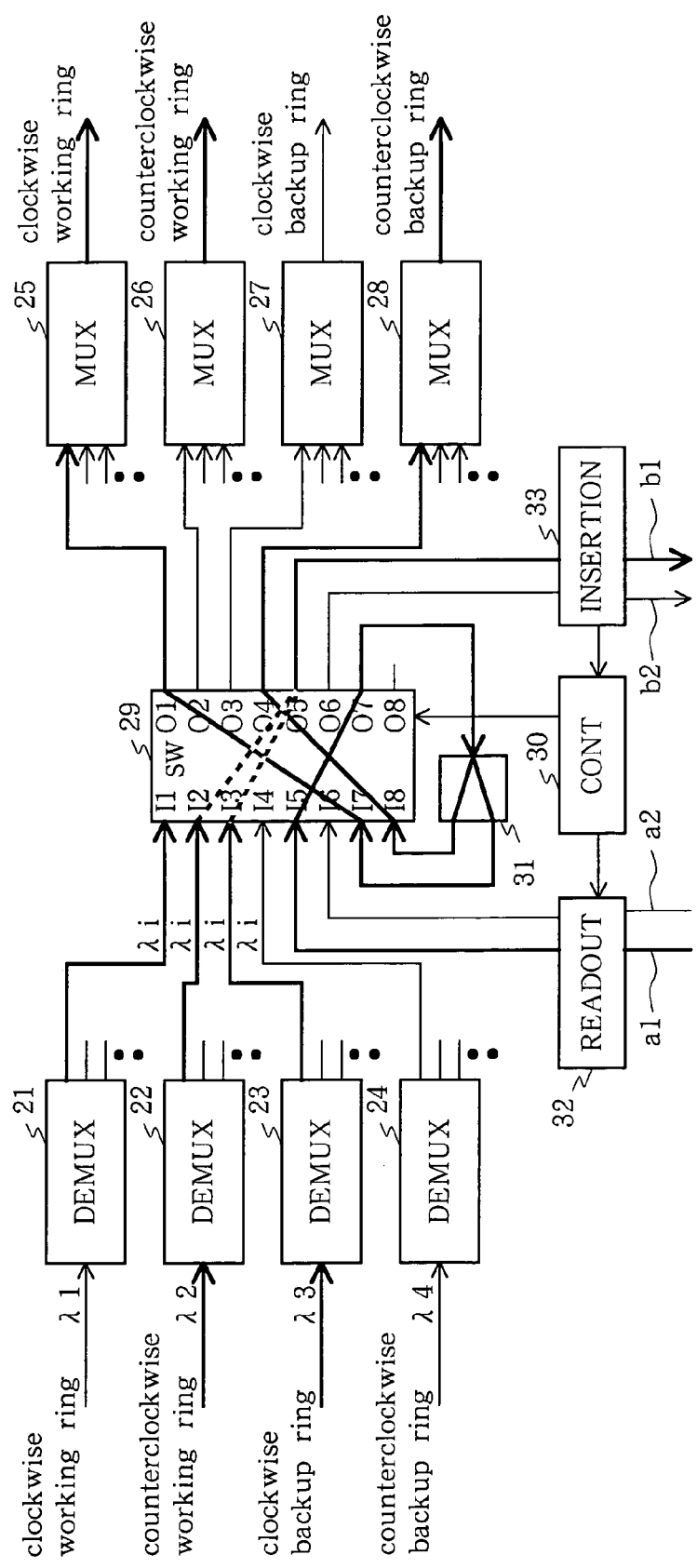
FIG. 6 shows an example of an operation mode configuration of node 1 shown in FIG. 5A and FIG. 5B.

FIG. 6 shows a configuration of 8×8 matrix type optical switch 29 within node 1 in which the bypass routes shown in FIG. 5A and FIG. 5B are set up. The working counterclockwise ring connected to input terminal I2 or the backup clockwise ring connected to input terminal I3 are alternately switched over to outgoing line a1, which is connected to output terminal O5, according to the time division switch over. Further, incoming line a1 connected to input terminal I5 is split into two lines by splitter device 31 to add them into a working clockwise ring and a backup counterclockwise ring through output terminal O1 and output terminal O4, respectively.

Figure 7A:
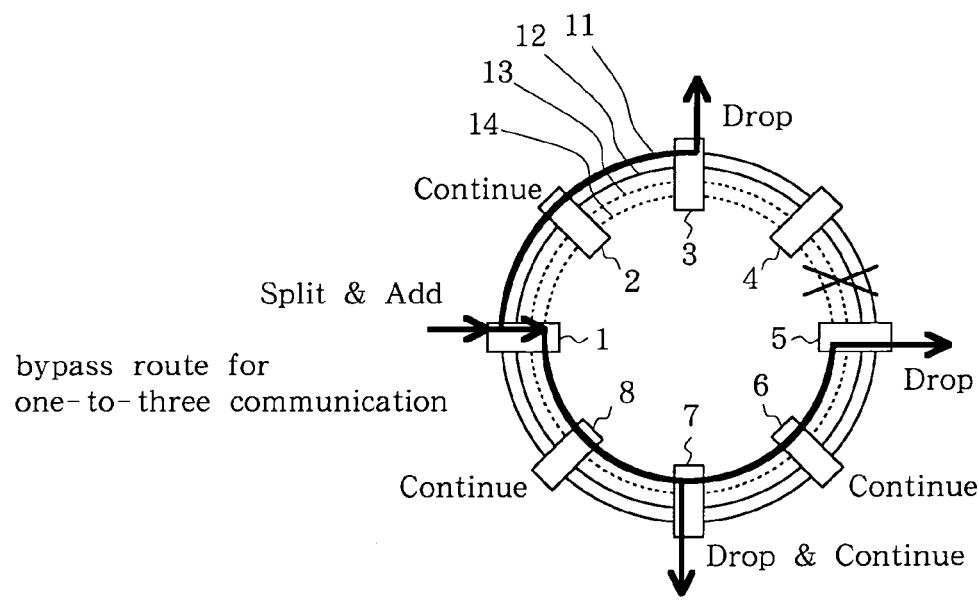
FIG. 7A and FIG. 7B show examples of operation mode configuration for a downstream connection and on upstream connection after a detailed information of a failure is acquired.
Figure 7B:
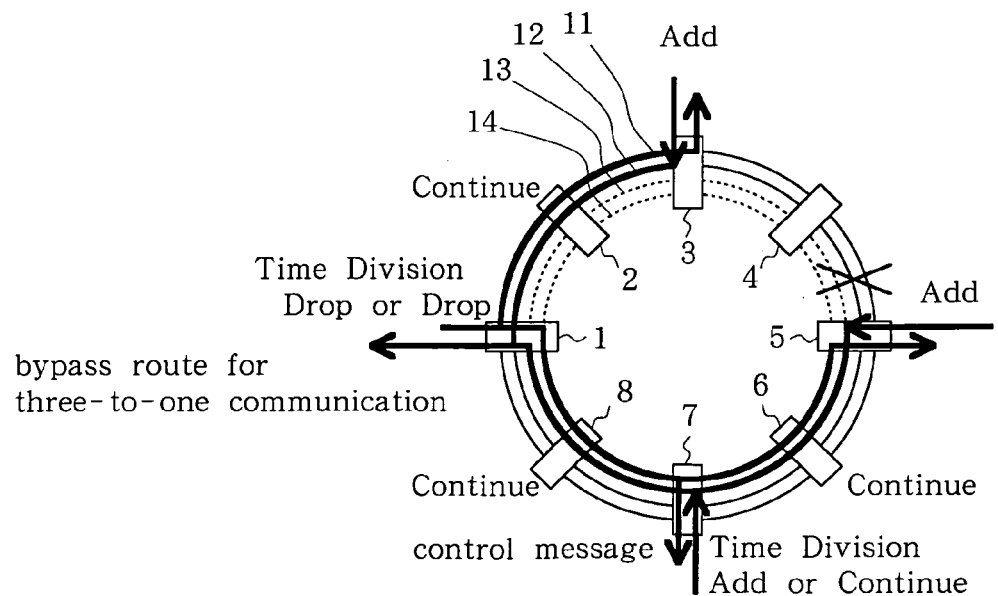

FIG. 7A and FIG. 7B show the operation mode configuration of nodes for the downstream connection and the upstream connection, respectively, after the bypass routes are set up and then the location of the failure is specified by collecting detailed information. Node 1 collects the detailed information on the failure to the downstream connection by using the upstream connection recovered from the failure. An extraordinary signal in the downstream connection is detected by node 5. Node 1 specifies that the location of the failure was between node 3 and node 5 according to the log record for the failure, which tells that the failure was not detected by node 3 but by node 5. And node 1 guess that nodes 3 and 5 are now located at the tail ends of a new bypass route for the downstream connection. Node 1 transmits a control message over the downstream connection to reconfigure the operation modes of nodes 3 and 5 from "Drop and Continue" operation mode to "Drop" operation mode, completing the failure recovery procedure to set up the bypass route.

Figure 8A:
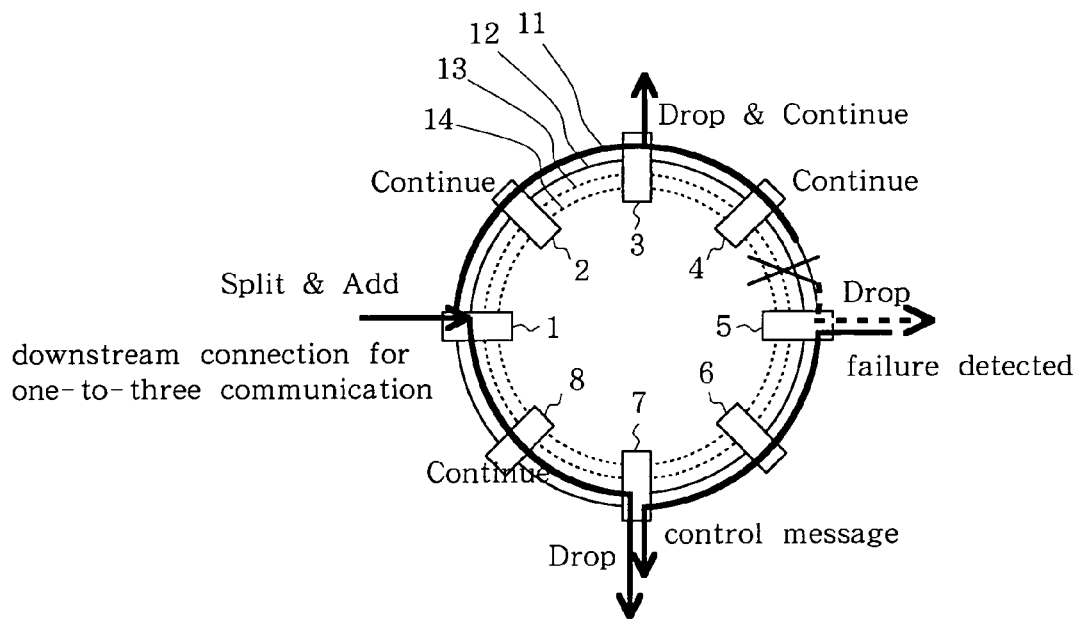
FIG. 8A and FIG. 8B show routes of connections for a one-to-multiple communication and a multiple-to-one communication in a 4-fiber bidirectional ring network and a second example of operation mode configurations of respective nodes in the ring for a downstream connection and an upstream connection, respectively.
Figure 8B:
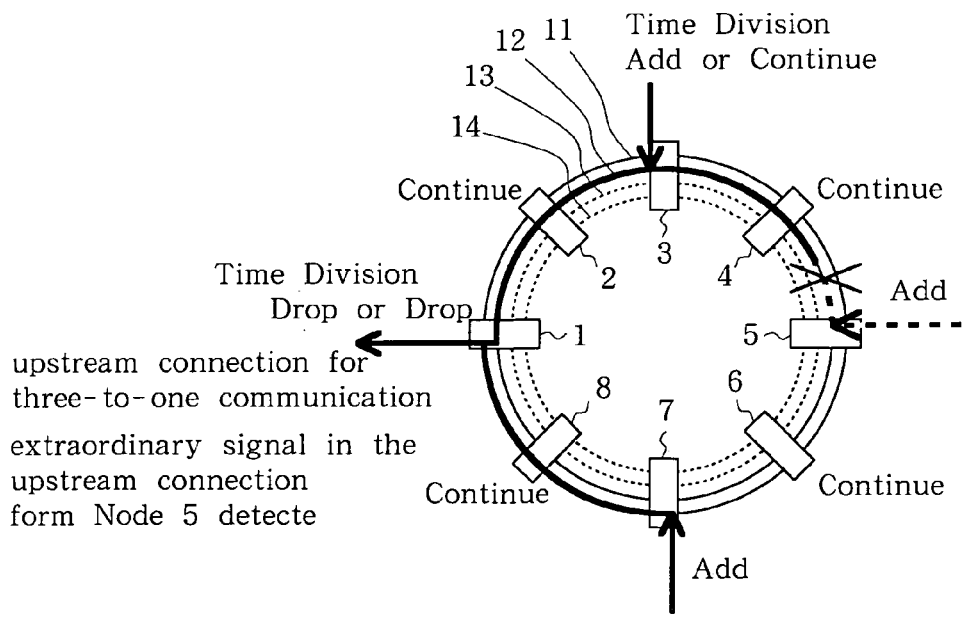

A second embodiment of the present invention is shown in FIG. 8A to FIG. 9B, in which another example of route set up, failure detection and recovery in case where a downstream connection for a one-to-three communication from node 1 to nodes 3, 5 and 7 and an upstream connection for a three-to-one communication from nodes 3, 5 and 7 to node 1 are set up, respectively, as in the case of the first embodiment FIG. 8A and FIG. 8B show an operation mode configuration of nodes just before a failure is detected in the downstream connection and an the upstream connection, respectively. As to the downstream connection shown in FIG. 8A, node 1 is in "Split and Add" operation mode and adds an incoming line into the downstream connection on both of working clockwise ring 11 and working counterclockwise ring 12. Nodes 3 and 5 drop an outgoing line from the downstream connection on working clockwise ring 11 and node 7 drops an outgoing line from the downstream connection on working counterclockwise ring 12. Since "Split and add" operation mode is configured, nodes 5 and 7 are located at the two tail ends of the route.

When a failure occurs between nodes 4 and node 5 as shown, node 5 at the tail end of the route, which detects an extraordinary signal in the downstream connection, transmits a control message to node 7, which is located at the another tail end of the route, to notify node 7 of the failure. A bypass route is set up between node 7, which was notified the extraordinary signal, and node 5, which detected the extraordinary signal, by using backup clockwise ring 13, recovering the downstream connection from the failure.

For the upstream connection shown in FIG. 8B, node 1 is in "Time Division Switch Over" ("Time Division Drop") operation mode and operates to select one out of working clockwise ring 11 or working counterclockwise ring 12 every constant time interval. When an extraordinary signal in the upstream connection from node 5 is detected node 1 transmits a control message over the downstream connection recovered from the failure instructing node 7 to carry out time division switch over of the upstream line such that a bypass route of the upstream connection can be set up between node 1 and node 5 through node 7 by using backup clockwise ring 13. The upstream connection is recovered from the failure by reconfiguring the operation mode of node 7 to "Time Division Switch Over" ("Time Division Add or Continue") operation mode.

Figure 9A:
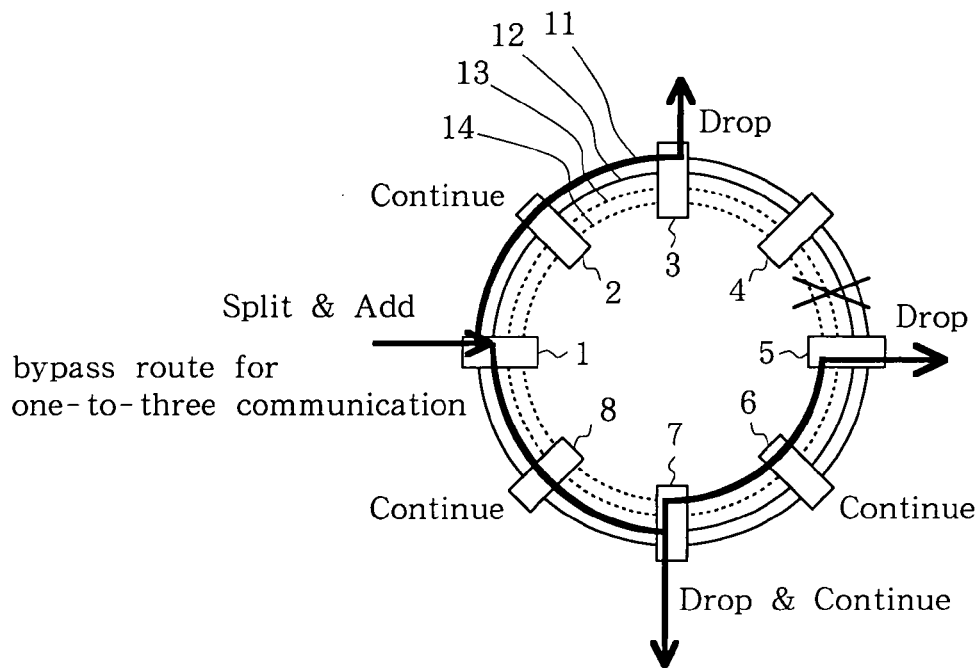
FIG. 9A and FIG. 9B show a second example of a bypass route after failure recovery and an operation mode of the node for a downstream connection and an upstream connection, respectively.
Figure 9B:
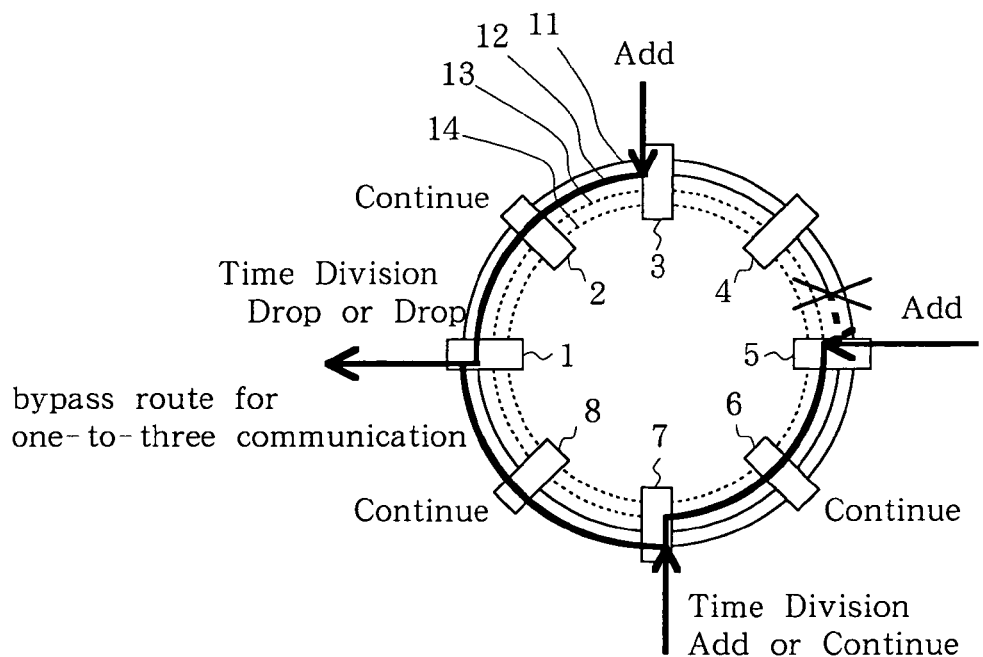

FIG. 9A and FIG. 9B shows the configuration of the bypass route and the operation modes of the nodes for the downstream connection and the upstream connection, respectively.

Although the first and second embodiments are described in case where failures occur simultaneously in downstream and upstream connections, the described failure recovery procedures for setting up bypass routes can be similarly applied to a failure which occurs independently only to either the downstream or the upstream connection.

In the 2-fiber ring system consisting of a clockwise ring and a counterclockwise ring as a working ring and the other as a backup ring the described failure recovery procedures ran be applied to a case where a bypass route is set up for a unidirectional connection configured as either one of the downstream connection and the upstream connection.

The failure recovery procedures for the upstream connection can be applied not only to an upstream connection for a multiple-to-one communication, onto which one-to-one communications are time division multiplexed and switched over, but also to an upstream connection for a multiple-to-one communication, onto which one-to-one communications are code-division multiplexed (CDM) and switched over, or are bit multiplexed and switched over. In such cases, the control messages for instructing the time division switch over for the upstream connection is not necessary. Nodes related to a communication are not limited to described nodes 1, 3, 5 and 7. In the described embodiments, "Drop and Continue" operation mode and "Split and Add" operation mode are realized by the combination of matrix type optical switch 29 and splitter device 31. However, it is of course possible to realize the same function by using a single optical switch having a splitting function capable of connecting one input terminal to two or more output terminals.

Further, the number of the input terminals as well as the output terminals of matrix type optical switch 29 is not limited to eight. Further, although the matrix type optical switch for wavelength division multiplexed lines has been described as a switch to configure or reconfigure the operation modes of the nodes, it is possible to use a SONET (Synchronous Optical Network) DCS (Digital Cross-connect System) for time division multiplexed connections or an ATM (Asynchronous Transfer Mode) switch for cell multiplexed connections as a switch to configure or reconfigure the operation modes of the nodes.

It is possible to transfer the control message by using a dedicated control channel installed between adjacent nodes and it is possible to exchange control messages through a network manager for managing the whole network by connecting respective nodes to the network manager through dedicated control lines.

As described hereinbefore, according to the present invention, the following effects are obtained:

1. A connection for a one-to-multiple communication and a multiple-to-one communication can be realized without using connections for multiple one-to-one communication consisting of a plurality of optical fibers or a plurality wavelength lines.

This is because the communication network node having the basic five operation modes, that is, "Add", "Continue", "Drop", "Split and Add" and "Drop and Continue" operation modes, and a combined "Time Division Switch Over"

operation mode, that is, "Time Division Add or Continue" and "Time Division Drop" operation modes are utilized.

2. A bypass route can be set up quickly when a failure occurs in a connection for the one-to multiple communication and the multiple-to-one communication.

The reason for this is that the operation modes of all of the nodes, which are related to the one-to-multiple communication and the multiple-to-one communication and require reconfiguration of operation mode in setting up a bypass route, are reconfigured by the detection of an extraordinary signal and the transfer of the control message and that the working ring and the backup ring are used.

What is claimed is:

1. A communication network system comprising a ring transmission path including a clockwise ring and a counter-clockwise ring, a plurality of communication network nodes on said rings and a control means to provide a connection from an incoming line and to an outgoing line on said rings, wherein said control means configures each of said communication network nodes in "Add" operation mode in which said incoming line is added to said connection, "Split and Add" operation mode in which said incoming line is split and added to branch routes of said connection, "Drop" operation mode in which said outgoing line is dropped from said connection, "Continue" operation mode in which said connection is transferred to another of said communication network nodes or "Drop and Continue" operation mode in which said connection is split, dropped to said outgoing line and transferred to another of said communication network nodes.

2. A communication network system as claimed in claim 1, wherein a connection for a one-to-multiple communication is provided, by means of that, along said connection from one of said communication network nodes configured in "Add" operation mode to another one of said communication network nodes configured in "Drop" operation mode, others of said communication network nodes are configured in "Drop and Continue" operation mode or configured in "Continue" operation mode.

3. A communication network system as claimed in claim 2, wherein said connection is recovered from a failure on a working route because of a bypass route set up on a backup ring in the direction opposite to a working ring on which said working route is set up by means of that, if there is none of said communication network nodes configured in "Drop and Continue" operation mode between the location of said failure and said communication network node configured in "Add" operation mode, said communication network node configured in "Add" operation mode is reconfigured to add said incoming line to said backup ring, otherwise, said communication network node configured in "Add" operation mode is reconfigured in "Split and Add" operation mode to add said incoming line to said backup ring and said working ring.

4. A communication network system as claimed in claim 3, wherein failure recovery is initiated, by means of that said communication network node configured in "Drop" operation mode detects an extraordinary signal caused by said failure and transmits a control message to notify said failure to said communication network node configured in "Add" operation mode over a ring bypassing said failure.

5. A communication network system as claimed in claim 1, wherein a connection for a one-to-multiple communication is provided, by means of that, along two branch routes for said connection on said clockwise ring and on said counterclockwise ring respectively from one of said communication network node configured in "Split and Add" operation mode to two of said communication network nodes configured in "Drop" operation mode others of said communication network nodes are configured in "Drop and Continue" operation mode or configured in "Continue" operation mode.

6. A communication network system as claimed in claim 5, wherein said connection is recovered from a failure on one of said two branch routes because of the extension of another one of said two branch routes onto a backup ring towards the location of said failure as a bypass, by means of that said communication network node configure in "Drop" operation mode, on said another one of said two branch routes is reconfigured in "Drop and Continue" operation mode.

7. A communication network system as claimed in claim 6, wherein failure recovery is initiated, by means of that said communication network node configured in "Drop" operation mode on said one of said two branch routes detects an extraordinary signal caused by said failure and transmits a control message to notify said failure to said communication network node configured in "Drop" operation mode on said another one of said two branch routes over a ring bypassing said failure.

8. A communication network system as claimed in claim 1, wherein said control means configures said communication network nodes in "Time Division Switch Over" operation mode to alternately switch over among "Add" operation mode, "Drop" operation mode and "Continue" operation mode.

9. A communication network system as claimed in claim 1, wherein said control means configures said communication network nodes in "Time Division Switch Over" operation mode to alternately switch over among "Add" operation mode, "Drop" operation mode and "Continue" operation mode, and wherein a connection for a time division multiplexed multiple-to-one communication is provided, by means of that, along said connection from one of said communication network nodes configured in "Add" operation mode to another one of said communication network node configured in "Drop" operation mode others of said communication network nodes are configured in "Time Division Switch Over" operation mode to alternately switch over between "Add" operation mode and "Continue" operation mode, configured in "Continue" operation mode.

10. A communication network system as claimed in claim 9, wherein said connection is recovered from a failure on a working route because of a bypass route set up on a backup ring in the direction opposite to a working ring on which said working route is set up, by means of that, if there is none of said communication network nodes configured in "Time Division Switch Over" operation mode between the location of said failure and said communication network node configured in "Drop" operation mode, said communication network node configured in "Drop" operation mode is reconfigured to drop said outgoing line from said backup ring, otherwise, said communication network node configured in "Drop" operation mode is reconfigured in "Time Division Switch Over" operation mode to alternately switch over between "Drop" operation mode to drop said outgoing line from said working ring and another "Drop" operation mode to drop said outgoing line from said backup ring.

11. A communication network system as claimed in claim 1, wherein said control means configures said communication network node in "Time Division Switch Over" operation mode to alternately switch over among "Add" operation mode, "Drop" operation mode and "Continue" operation mode, and wherein a connection for a time division multiplexed multiple-to-one communication is provided, by means of that, along two branch routes for said connection on said clockwise ring and on said counterclockwise ring respectively from two of said communication network nodes configured in "Add" operation mode to one of said communication network nodes configured in "Time Division Switch Over" operation mode to alternately switch over between "Drop" operation mode to drop said outgoing line from said clockwise ring and "Drop" operation mode to drop said outgoing line from said counterclockwise ring others of said communication network nodes are configured in "Time Division Switch Over" operation mode to switch over between "Add" operation mode and "Continue" operation mode or configured in "Continue" operation mode.

12. A communication network system as claimed in claim 11, wherein said connection is recovered from a failure on one of said two branch routes because of the extension of another one of said two branch routes onto a backup ring towards the location of said failure as a bypass, by means of that said communication network node configured in "Add" operation mode on said another one of said two branch routes is reconfigured in "Time Division Switch Over" operation mode to alternately switch over between "Add" operation mode and "Continue" operation mode.

13. A communication network system as claimed in claim 1, wherein said control means configures said communication network nodes in "Time Division Switch Over" operation mode to alternately switch over among "Add" operation mode, "Split and Add" operation mode, "Drop" operation mode, "Continue" operation mode or "Drop and Continue" operation mode.

14. A communication network system as claimed in claim 13, wherein a downstream connection for a one-to-multiple communication is provided, by means of that, along said connection from one of said communication network nodes configured in "Add" operation mode to another one of said communication network nodes configured in "Drop" operation mode, others of said communication network nodes are configured in "Drop and Continue" operation mode or configured in "Continue" operation mode, add wherein an upstream connection for a multiple-to-one communication is provided, by means of that, along said connection from one of said communication network nodes configured in "Add" operation mode to another one of said communication network node configured in "Drop" operation mode, others of said communication network node, are configured in "Time Division Switch Over" operation mode to switch over between "Add" operation mode and "Continue" operation mode or configured in "Continue" operation mode.

15. A communication network system as claimed in claim 13, wherein a downstream connection for a one to-multiple communication is provided, by means of that, along said connection from one of said communication network nodes configured in "Add" operation mode to another one of said communication network nodes configured in "Drop" operation mode, others of said communication network nodes are configured in"Drop and Continue" operation mode or configured in "Continue" operation mode, and wherein an upstream connection for a multiple-to-one communication is provided, by means of that, along two branch routes for said connection on said clockwise ring and on said counterclockwise ring respectively from two of said communication network nodes configured in "Add" operation mode to one of said communication network nodes configured in "Time Division Switch Over" operation mode to alternately switch over between "Drop" operation mode to drop said outgoing line from said clockwise ring and "Drop" operation mode to drop said outgoing line from said counterclockwise ring, others of said communication network nodes are configured in "Time Division Switch Over" operation mode to switch over between "Add" operation mode and "Continue" operation mode or configured in "Continue" operation mode.

16. A communication network system as claimed in claim 13, wherein a downstream connection for a one-to-multiple communication is provided, by means of that, along two branch routes for said connection on said clockwise ring and on said counterclockwise ring respectively from one of said communication network nodes configured in "Split and Add" operation mode to two of said communication network nodes configured in "Drop" operation mode, others of said communication network nodes are configured in "Drop and Continue" operation mode or configured in "Continue" operation mode, and wherein an upstream connection for a multiple-to-one communication is provided, by means of that, along said connection from one of said communication network nodes configured in "Add" operation mode to another one of said communication network node configured in "Drop" operation mode, others of said communication network nodes are configured in "Time Division Switch Over" operation mode to switch over between "Add" operation mode and "Continue" operation mode or configured in "Continue" operation mode.

17. A communication network system as claimed in claim 13, wherein a downstream connection for a one-to-multiple communication is provided, by means of that, along two branch routes for said connection on said clockwise ring and on said counterclockwise ring respectively from one of said communication network nodes configured in "Split and Add" operation mode to two of said communication network nodes configured in "Drop" operation mode, others of said communication network nodes are configured in "Drop and Continue" operation mode or configured in "Continue" operation mode, and wherein an upstream connection for a multiple-to-one, communication is provided, by means of that, along two branch routes for said connection on said clockwise ring and on said counterclockwise ring respectively from two of said communication network nodes configured in "Add" operation mode to one of said communication network nodes configured in "Time Division Switch Over" operation mode to alternately switch over between "Drop" operation mode to drop said outgoing line from said clockwise ring and "Drop" operation mode to drop said outgoing line from said counterclockwise ring, others of said communication network nodes are configured in "Time Division Switch Over" operation mode to switch over between "Add" operation mode and "Continue" operation mode or configured in "Continue" operation mode.

18. A communication network system as claimed in claim 14, wherein said ring transmission path includes a working clockwise ring, a working counterclockwise ring, a backup clockwise ring and a backup counterclockwise ring, and wherein said downstream connection and said upstream connection on said working rings are recovered from a failure because of bypass routes set up on said backup rings.

19. A communication network system as claimed in claim 14, wherein said communication network node configured in "Add" operation mode for said downstream connection transmits a control message to instruct said communication network node configured in "Time Division Switch Over" operation mode for said upstream connection to alternately switch over between operation modes, and transmits a control message to instruct said communication network nodes to reconfigure operation modes for said upstream connection when a failure occurs, over said downstream connection.

20. A communication network node within a communication network system comprising a ring transmission path including a clockwise ring and a counterclockwise ring and a plurality of communication network nodes on said rings to provide a connection from an incoming line and to an outgoing line on said rings, wherein said communication network node includes a control means to configure each of said communication network node in "Add" operation mode in which said incoming line is added to said connection, "Split and Add" operation mode in which said incoming line is split and added to branch routes of said connection, "Drop" operation mode in which said outgoing line is dropped from said connection, "Continue" operation mode in which said connection is transferred to another of said communication network nodes or "Drop and Continue" operation mode in which said connection is split, dropped to said outgoing line and transferred to another of said communication network nodes.

21. A communication network node as claimed in claim 20, further comprising a matrix type optical switch to set up said connections on said rings from said incoming line to said outgoing line and a splitter device to connect one of input terminals of said matrix type optical switch to a plurality of output terminals of said matrix type optical switch.

22. A communication network node as claimed in claim 20, wherein said control means controls "Time Division Switch Over" operation mode to alternately switch over among "Add" operation modes "Split and Add" operation mode, "Drop" operation mode, "Continue" operation mode or "Drop and Continue" operation mode.

* * * * *